UNITED STATES PATENT OFFICE.

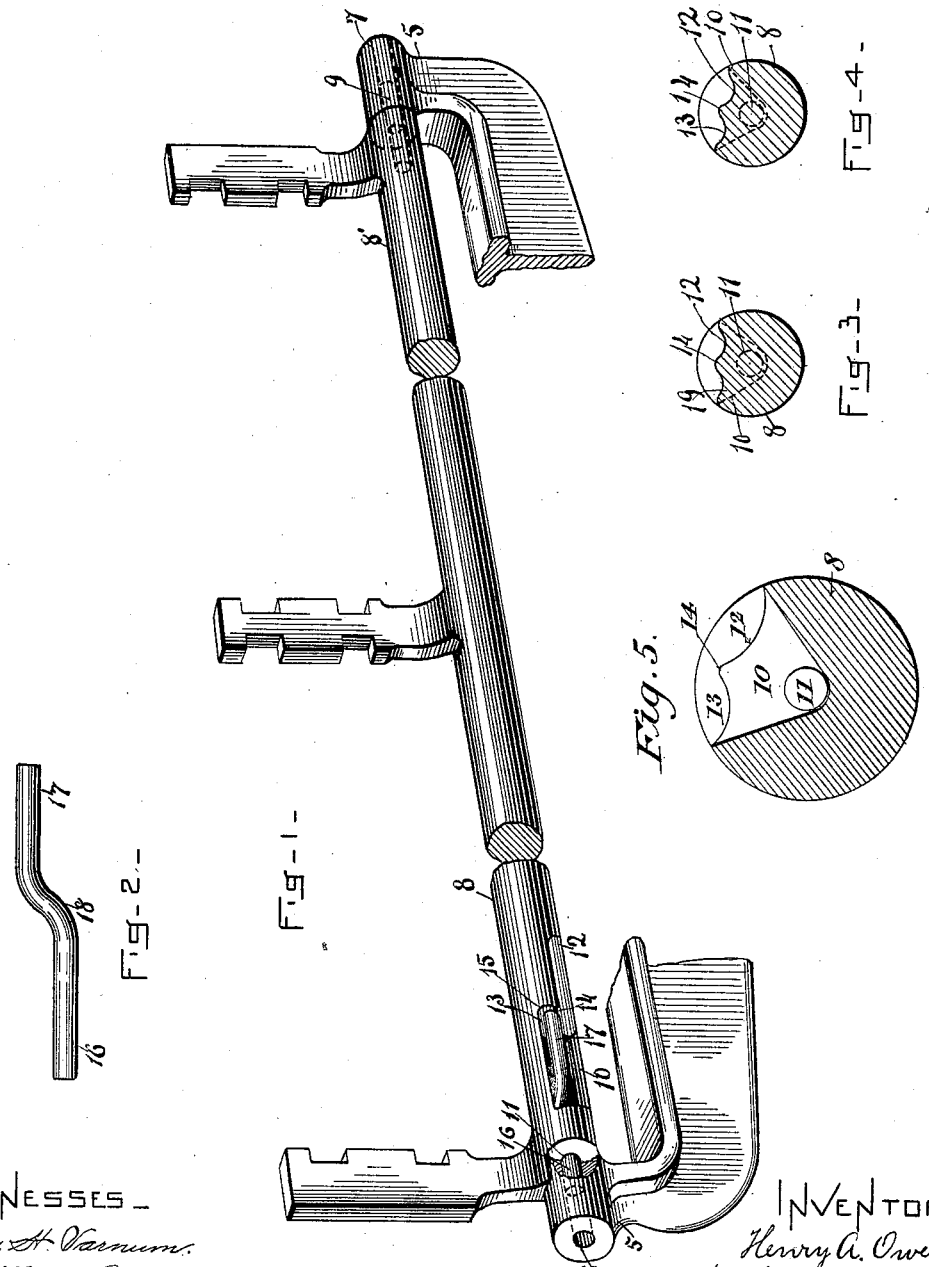

HENRY A. OWEN, OF WHITINSVILLE, MASSACHUSETTS.

SHAFT CONNECTION.

SPECIFICATION forming part of Letters Patent No. 583,153, dated May 25, 1897.

Application filed December 18, 1896. Serial No. 616,143. (No model.)

*To all whom it may concern:*

Be it known that I, HENRY A. OWEN, of Whitinsville, in the county of Worcester and State of Massachusetts, have invented certain new and useful Improvements in Shaft Connections; and I hereby declare that the following is a full, clear, and exact description of the same, reference being had to the accompanying drawings, forming part of this specification.

This invention relates to improvements in means for rotatably connecting shafts to fixed supports in the nature of bearings, having particular reference to means for pivotally connecting top-roll frames of spinning-machines to their bearing-supports.

The object of the invention is to so construct a novel device forming a pivotal connection between the shaft and one of its fixed supports that the shaft may be readily removed for any purpose.

The object of the invention is also to improve the pivotal connection between the shaft and its fixed supports or bearings.

The invention consists in furnishing the shaft or one of its fixed supports with an open depression forming an axial continuation of a bore, which bore extends to the end of the shaft or support, and providing a locking device in or adjacent to said depression, together with a pivot reciprocal in said depression and bore and designed to be engaged by the locking device.

The invention also consists in a shaft connection comprising a portion furnished with an open depression, a bore extending therefrom, and a locking-step eccentrically disposed with relation to the axis of the bore, together with a key or pivot having a member adapted to be engaged by the locking-step.

The invention also consists in the pivot having an offset locking-arm and in the means for locking the arm.

The invention also consists in such other novel features of construction and combination of parts as shall hereinafter be more fully described, and pointed out in the claims.

Figure 1 represents a perspective view of portions of a top-roll frame and its bearing-supports fixed against separation, showing the construction of the connection. Fig. 2 represents an enlarged view of the connection-pivot. Fig. 3 represents an enlarged cross-sectional view of a shaft, showing one form of locking-step. Fig. 4 represents a similar view showing the preferred form of locking-step—that is, one located out of the circle in which the locking-arm of the pivot swings. Fig. 5 represents an enlarged sectional view of the shaft, taken on a line through the open depression and looking toward the locking-step.

Similar numbers of reference designate corresponding parts throughout.

In many machines it is found desirable to pivotally mount a shaft or other portion between bearings which are fixed against separation, the portion to be pivoted fitting between the bearings. Various expedients have been adopted to pivotally connect the shaft to the bearings, so that the shaft may be removed, that most commonly used being screw-centers which work through screw-threaded bores in the bearing-supports. These are expensive in construction and require considerable time for adjustment. They are also liable to become loose unless furnished with set-screws, which adds to the expense.

My desire has been to provide a simple and efficient connection which should require but little time for adjustment and when so adjusted would not become loose through accident.

In the drawings, 5 5 represent bearing-supports modified in construction for the top-roll frame of a spinning-machine, which are fixed against separation and between which it is desired to pivotally mount a shaft. Through the supports are formed bearings 6 and 7, which are in axial alinement.

The shaft 8, as herein shown, is designed for but partial rotation, but it is understood to represent any shaft capable of being pivotally supported by the supports. The arms extending from the shaft form the frame in which the top rolls of the spinning-machine work. In the end 8' of the shaft is fixed a pivot 9, which is mounted in the bearing 7, but a removable pivot may be substituted for the fixed pivot. In the opposite end of the shaft is formed a depression or cavity 10, extending inward beyond the axis, on which the shaft is intended to swing and of a segmental cross-section, as is indicated in dotted lines in Figs. 3 and 4. This depression is connected with the end of the shaft by the bore 11 in alinement with the pivot 9. Extending from the other end of the depression is the groove 12 and the locking-step 13, having the lip 14 and the abutment 15.

The pivotal connection comprises the pivot member 16 and the offset locking member 17, connected by the arm 18. The locking member is preferably parallel with the pivot, but not necessarily so. The arm 18 is proportioned with reference to the radial positions of the groove 12 and the step 13, so that while the locking member 17 lies in the groove 12 the pivotal connection may be reciprocated, but when the locking member is turned over the lip 14 into the locking-step 13 this step, being slightly outside the circle in which the locking member swings, exerts a frictional contact on the member and through the leverage exerted on the pivot 16 holds the same against chattering in the bore 11. The abutment 15 at the same time prevents the inward movement of the connection.

In the construction shown in Fig. 3 the step 19 is located in a radius similar to that of the groove 12, the locking-lip 14 preventing the swinging backward of the member 17, and no strain being exerted on said member when so locked.

The operation is very simple and will readily be understood by reference to the drawings. In placing and securing the shaft the fixed pivot 9 is first inserted in the bearing 7, the bore 11 is then brought opposite the bearing 6, and the pivot member 16 is pushed through the bore 11 into the bearing 6. A tool is then inserted between the wall of the depression 10 and the member 17, and this member is pried or pushed over the lip 14 into the locking-step 13 and is there held. For the removal of the shaft this operation is reversed.

It is obvious that this locking and connecting device may be pivoted to the bearing-support, and will then operate in a similar manner and accomplish the same result.

Having thus described my invention, I claim as new and desire to secure by Letters Patent—

1. In a shaft connection, the combination with a shaft having an axial bore, an open depression forming a continuation of the bore, and a fixed locking device adjoining said depression, of a pivot reciprocable and rotatable in the bore and having a locking member adapted to be engaged by the locking device when the pivot is partially rotated.

2. In a shaft connection, a pivot having an offset locking member, and a mounting for the pivot in which the same is reciprocable and rotatable, and having a locking device for engaging the locking member.

3. In a shaft connection, the combination with a shaft having an axial bore, an open depression forming a continuation of the bore and having a groove and a locking-step, between which is a locking-lip, of a pivot longer than the bore and having an offset locking member engageable with the step.

4. The combination, with the shaft 8 having the bore 11, the depression 10, the groove 12, and the step 13 extending from the depression and having the lip 14 and abutment 15, of the pivot 16 having the offset member 17 connected by the arm 18, as and for the purpose described.

HENRY A. OWEN.

Witnesses:
GEO. B. HAMBLIN,
V. M. POLLOCK.